United States Patent [19]

Rasmusson

[11] Patent Number: 5,515,432
[45] Date of Patent: * May 7, 1996

[54] METHOD AND APPARATUS FOR VOLUME AND INTELLIGIBILITY CONTROL FOR A LOUDSPEAKER

[75] Inventor: Jim A. J. Rasmusson, Raleigh, N.C.

[73] Assignee: Ericsson Inc., Research Triangle Park, N.C.

[*] Notice: The portion of the term of this patent subsequent to Nov. 14, 2012, has been disclaimed.

[21] Appl. No.: 460,637

[22] Filed: Jun. 2, 1995

Related U.S. Application Data

[62] Division of Ser. No. 157,964, Nov. 24, 1993, Pat. No. 5,467,393.

[51] Int. Cl.⁶ ................................................ H04M 9/08
[52] U.S. Cl. ......................... 379/388; 379/389; 379/390; 379/58
[58] Field of Search ................................. 379/388, 389, 379/390, 58, 61; 81/106

[56] References Cited

U.S. PATENT DOCUMENTS

| | | | |
|---|---|---|---|
| 4,122,507 | 10/1978 | Queen | 361/94 |
| 4,296,278 | 10/1981 | Cullison et al. | 178/1 |
| 4,490,691 | 12/1984 | Dolby | 333/14 |
| 4,633,483 | 12/1986 | Takahashi et al. | 375/25 |
| 4,715,063 | 12/1987 | Haddad et al. | 379/390 |
| 4,721,923 | 1/1988 | Bares et al. | 330/284 |
| 4,741,018 | 4/1988 | Potratz et al. | 379/58 |
| 4,843,621 | 6/1989 | Potratz | 379/58 |
| 4,893,349 | 1/1990 | Eastmond et al. | 455/205 |
| 5,014,294 | 5/1991 | Kromenaker et al. | 379/58 |
| 5,115,471 | 5/1992 | Liden | 381/106 |
| 5,155,743 | 10/1992 | Jacobs | 375/28 |
| 5,170,435 | 12/1992 | Rosen et al. | 381/86 |
| 5,226,178 | 7/1993 | Eastmond et al. | 455/23 |

FOREIGN PATENT DOCUMENTS

| | | |
|---|---|---|
| 0290952A3 | 5/0588 | European Pat. Off. . |
| 0505645A1 | 9/1992 | European Pat. Off. . |
| 3837538A1 | 8/1989 | Germany . |
| WO93/18626 | 9/1993 | WIPO . |

OTHER PUBLICATIONS

EPO Search Report, EP 94 40 2558, Mar. 15, 1995.
Rabiner, *Digital Processing of Speech Signals,* Bell Laboratories, Incorporated, 1978, pp. 177,239.

*Primary Examiner*—Jeffery Hofsass
*Assistant Examiner*—Jacques M. Saint-Surin
*Attorney, Agent, or Firm*—Bell, Seltzer, Park & Gibson

[57] ABSTRACT

Selectively compressing the signal supplied to a loudspeaker based upon the volume setting for the sound level to be produced by the loudspeaker improves the intelligibility of human speech produced by a loudspeaker at high volume levels. Compression of the signal to the loudspeaker prevents the loudspeaker from overloading. The level of compression may be adjusted based upon the volume setting. The amplitude of an audio signal sent to a loudspeaker may be increased if below a preselected pivot point and increased if above the pivot point. The amount of increase or decrease in the amplitude may be proportional to the difference between the amplitude of the audio signal and the pivot point. This difference may also be raised to the power of a shape factor to determine the amount of increase or decrease in the amplitude of the audio signal.

17 Claims, 8 Drawing Sheets

| VOLUME LEVEL | SHAPE FACTOR | PIVOT POINT | COMPRESSION RATIO |
|---|---|---|---|
| 0 | 0 | - | 1:1 |
| 1 | 0 | - | 1:1 |
| 2 | 0 | - | 1:1 |
| 3 | 0 | - | 1:1 |
| 4 | 1 | -12dB | 1:2 |
| 5 | 2 | -8dB | 1:3 |
| 6 | 3 | -6dB | 1:4 |
| 7 | 4 | -4dB | 1:5 |

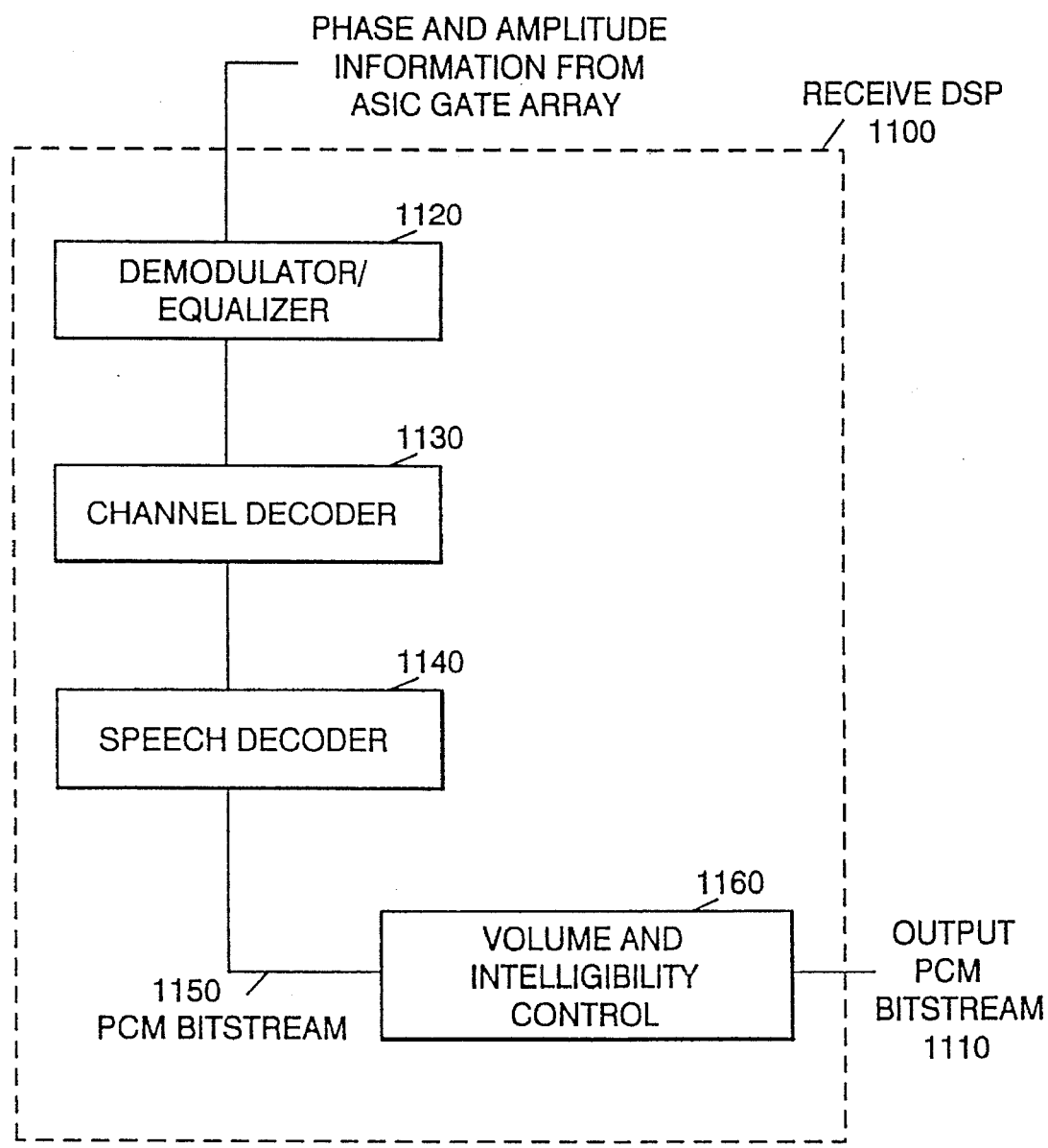

5,515,432

METHOD AND APPARATUS FOR VOLUME AND INTELLIGIBILITY CONTROL FOR A LOUDSPEAKER

This application is a divisional of application Ser. No. 08/157,964, filed Nov. 24, 1993, now patented U.S. Pat. No. 5,467,393.

FIELD OF THE INVENTION

The present invention relates generally to the field of audio systems which include a loudspeaker. The present invention is particularly applicable for use in the field of mobile communications and more particularly cellular speakerphones for use in high ambient noise environments such as an automobile.

BACKGROUND OF THE INVENTION

For reasons of safety and convenience, cellular radiotelephones often provide hands-free operation. By using a loudspeaker and external microphone the drivers of automobiles may engage in telephone conversations without having to take their hands from the steering wheel. A conventional hands-free system is illustrated in FIG. 1. FIG. 1 illustrates, a radiotelephone 130 connected to a remote loudspeaker 110 and a microphone 120 located within an automobile (represented by the box 100). Often, the volume of the loudspeaker 110 must be turned up quite loud for the driver to be able to hear the caller over ambient noise such as the noise of the engine, wind and road. Radiotelephones 130 still commonly use a moving coil loudspeaker 110. In fact, radiotelephones often have the loudspeaker placed in the handset of the radiotelephone, thereby restricting the size of the loudspeaker 110 to the space available in the handset.

FIG. 2 represents a cross-sectional schematic view of a moving coil loudspeaker. A flexible edge suspension 220 and a flexible center suspension 230 freely suspend a diaphragm element 270 in an open frame housing 298. The diaphragm 270 is nominally conical in shape. The diaphragm 270 is mechanically coupled to a voice coil 240 which is situated around a permanent magnet 280. Electrical audio signals (i.e., alternating currents of varying frequency and amplitude) are coupled to the coil 240 via a pair of wires 250.

The alternating currents of the electrical audio signals coupled to the coil 240 give rise to magnetic fields oriented either parallel or anti-parallel to the magnetic field of the permanent magnet 280. The orientation of the magnetic fields depends upon the direction of current flow through the coil 240. The magnetic fields created by the alternating currents in the coil 240 establish either forces of attraction or repulsion with respect to the magnetic field of the permanent magnet 280. Because of the mechanical coupling between the coil 240 and the diaphragm 270 and the freedom of movement of the diaphragm in the plane parallel to the forces created by parallel or anti-parallel magnetic fields (i.e. perpendicular to plane 215), changes in the direction and amplitude of the current generated by the electrical audio signal are translated into axial dislocations of the diaphragm 270.

Pressure waves generated by the axial dislocation of the diaphragm 270 propagate in the air as sound waves. For a given frequency, larger dislocations are associated with greater levels of volume. The magnitude of the sound pressure level, or volume, is directly related to the magnitude of the dislocation 210 of the diaphragm element 270 with regard to plane 215. To increase the volume of the sound (i.e., sound pressure levels) emanating from a dynamic loudspeaker such as that illustrated in FIG. 2, one simply increases the amplitude of the drive signal to the electrical contacts 250 which results in an increased deflection 210 of the diaphragm 270.

To faithfully reproduce sound, the loudspeaker 200 should have a relatively flat frequency response. In other words, over the loudspeaker's range of operating frequencies, electrical signals of the same amplitude should produce the same sound pressure level irrespective of the frequency of the signal. FIG. 3 illustrates a number of frequency responses for loudspeakers. The solid line 310 of FIG. 3 represents the ideal flat frequency response for a loudspeaker.

Unfortunately, physical realities give the loudspeaker 200 less than ideal frequency characteristics. Because of factors such as size and materials, most loudspeakers—especially low-cost versions—have sound reproduction characteristics that are a relatively strong function of frequency. The dotted line 320 of FIG. 3 shows an example of conventional loudspeaker characteristics. FIG. 3 also shows the resonant frequency 330 of the loudspeaker. As illustrated in FIG. 3, the resonant frequency 330 is the frequency at which the loudspeaker produces maximum sound pressure levels for a given input signal level.

As seen in FIG. 2, the diaphragm 270 is physically constrained with regard to the absolute magnitude 210 of dislocation. Overload or clipping of the loudspeaker occurs when the amplitude of the drive signal applied to the electrical terminals 250 would require the diaphragm 270 to move beyond the physical limitation of the suspensions 220, 230 or the open frame housing 290 of the loudspeaker. FIG. 4 illustrates that applying a fixed gain to a loudspeaker having the loudspeaker characteristic 410 shown by the dotted line results in the response shown at 420. From FIG. 4 it can be seen that loudspeaker overload will often first occur at the resonant frequency 330 of the loudspeaker. Loudspeaker overload occurs when the response exceeds the clipping level 400 as seen in FIG. 4. While illustrated as a linear function in FIG. 4 for purposes of illustration, the clipping level 400 is actually a highly non-linear and frequency dependent effect. Loudspeaker overload causes distortion of signals near the resonant frequency and produces harmonic overtones which interfere with audio signals at higher frequencies.

Use of a loudspeaker in a radiotelephone apparatus magnifies the phenomena of overload because the loudspeaker primarily reproduces human speech. As shown in FIG. 5, the power density spectrum for human speech has a definite bias for lower frequencies. Most of the energy of human speech lies at or near 500 Hz, however, the higher frequencies (i.e., 1000–3000 Hz), which are associated with the lower amplitude levels, provide most of the intelligibility. As can be seen from FIG. 5, the power density in human speech often closely matches the resonant frequency of the conventional loudspeaker used in a radiotelephone handset. For example, for loudspeakers of the type conventionally used within radiotelephone handsets, a resonant frequency of near 600 Hz is common. Therefore, volume levels which would not produce overload when reproducing music or other audio signals may result in overload when reproducing human speech.

Loudspeaker overload generates harmonic overtones in the higher frequencies where the intelligibility information of human speech exists. Overload causes wide-band distortion at loud volumes which combines with the informational higher frequencies of the audio signal and thereby makes it difficult to understand the speech. When overload occurs, increasing the amplitude of the audio signal does not increase the intelligibility of the speech carried in the audio signal. Thus, for example, the driver of an automobile faces a situation where turning up the volume to overcome the ambient noise of the automobile results in an unintelligible, albeit audible, garble.

The sound quality, or intelligibility of the voice signal can be improved somewhat by giving consideration to the design of the baffle and loudspeaker cavity. However, the limited space in a portable radiotelephone handset limits the availability of passive design choices such as the baffle and cavity design to eliminate the problems caused by overload of the loudspeaker.

SUMMARY OF THE INVENTION

One object of the present invention is to improve the intelligibility of audio systems including loudspeakers.

Another object of the present invention is to provide improved hands free operation of a portable radiotelephone in conditions of high ambient noise.

The present invention provides loudspeaker overload reducing means responsive to a selected volume setting of an audio system volume control. The loudspeaker overload reducing means selectively decreases the amplitude of the electrical audio signal to the loudspeaker to reduce overload in the loudspeaker and thereby increase the intelligibility of human speech. The overload reducing means may provide variable amplitude compression of the audio signal supplied to the loudspeaker to reduce loudspeaker overload. By limiting the use of compression to selected volume settings, the present invention reduces the loss of fidelity of the sound from the loudspeaker over the entire range of operation while maintaining the intelligibility of the sound from the loudspeaker at higher volume levels.

A particular aspect of the present invention provides an intelligibility controlled speakerphone. The speakerphone converts audible sounds into an electrical audio signal and converts a received electrical audio signal into audible sounds. The speakerphone telephonically transmits and receives the electrical audio signals. According to the present invention, the speakerphone includes means for sensing the volume setting of the speakerphone and for selectively decreasing the amplitude of the received electrical audio signal to prevent the diaphragm of a loudspeaker in the speakerphone from being driven beyond the absolute magnitude of dislocation of the diaphragm of the loudspeaker. An intelligibility controlled speakerphone according to the present invention has particular applicability in environments requiring hands free operation and where high levels of ambient noise are present. Quite often the need for hands free operation and the presence of high levels of ambient noise arise in the context of cellular telephones for use in automobiles.

A particular embodiment of the present invention provides a digital intelligibility controlled audio system which converts input audio signals to a pulse code modulated (PCM) input bitstream. A digital signal processor then processes the input PCM bitstream to selectively decrease the amplitude of signals above a preselected pivot point amplitude to create an output PCM bitstream. Optionally, the digital signal processor selectively increases the amplitude of the input PCM bitstream for amplitudes of the input PCM bitstream below the preselected pivot point. The digital signal processor may determine the amount of increase or decrease in the amplitude of the input PCM bitstream based upon the deviation from the preselected pivot point. The amount of increase and decrease may be further controlled by a shape factor such that the difference between an input PCM sample and the pivot point raised to the power of the shape factor determines the amount of increase or decrease.

Accordingly, the present invention increases the intelligibility of human speech reproduced through a volume controlled loudspeaker. The present invention detects whether the amplitude of an audio signal input to a loudspeaker will cause the loudspeaker to overload. Selectively decreasing the amplitude of the audio signal input to the loudspeaker reduces the likelihood of the loudspeaker overloading. Optionally, the audio signal input to the loudspeaker may be selectively increased and decreased.

A particular embodiment of the present invention applies a compression to the audio signal in proportion to the volume setting. At low volume levels, no compression is applied. Increasing the volume level increases the level of amplitude compression applied to prevent overload of the loudspeaker. While sacrificing fidelity of the reproduced sound at high volume levels the present invention produces reproduced sound which retains its intelligibility of speech. At lower volume levels, the fidelity of the sound remains unaffected. Optionally, the present invention gradually applies the amplitude compression as the volume increases, thereby making the transition imperceptible to the user and improving the user's perception of the sound quality. Coupling intelligibility control to the volume control affords the user maximum utility of the dynamic compression control in a convenient and uncomplicated manner.

BRIEF DESCRIPTION OF THE DRAWINGS

FIG. 11 schematically illustrates an alternative embodiment of a receive digital signal processor.

DESCRIPTION OF THE PREFERRED EMBODIMENTS

The present invention now will be described more fully hereinafter with reference to the accompanying drawings in which preferred embodiments of the invention are shown. The present invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention reduces loudspeaker overload by reducing the dynamic content of speech. Peaks are compressed and, optionally, low amplitude passages in speech signals are enhanced. Applying a gain of less than unity to signal levels which exceed a predefined pivot point and, optionally, applying a gain of greater than unity to signal levels below the pivot point accomplishes the desired reduction in the dynamic content of speech. As used herein, the term pivot point refers to the input amplitude where the gain applied to the signal equals unity, or 0 dB. In certain embodiments of the present invention the ratio of compression and the pivot point are selected in an adaptive manner.

Applying high levels of compression at high volume levels avoids overloading the loudspeaker and enhances the intelligibility of the reproduced speech signal. As the volume level decreases the level of compression decreases, thereby enhancing the fidelity of the sound reproduction. At low volume levels, no compression may be applied, thereby achieving the maximum fidelity available from the loudspeaker. Fidelity in this regard refers to the accuracy of sound reproduction.

The present invention will now be described with respect to a particular embodiment of a radiotelephone, such as a cellular telephone. As will be appreciated by one of skill in this art, various other methods of telephonically transmitting audio signals may be employed in practicing the methods of the present invention. For example, traditional landline telephone transmission or mobile telephones or other forms of speech oriented communications may all benefit from the teachings of the present invention. Aspects of the present invention are equally well suited to any speakerphone having means for converting audible sounds into an electrical audio signal, converting a received electrical audio signal into audible sounds and telephonically transmitting and receiving those electrical audio signals.

Figure 1:
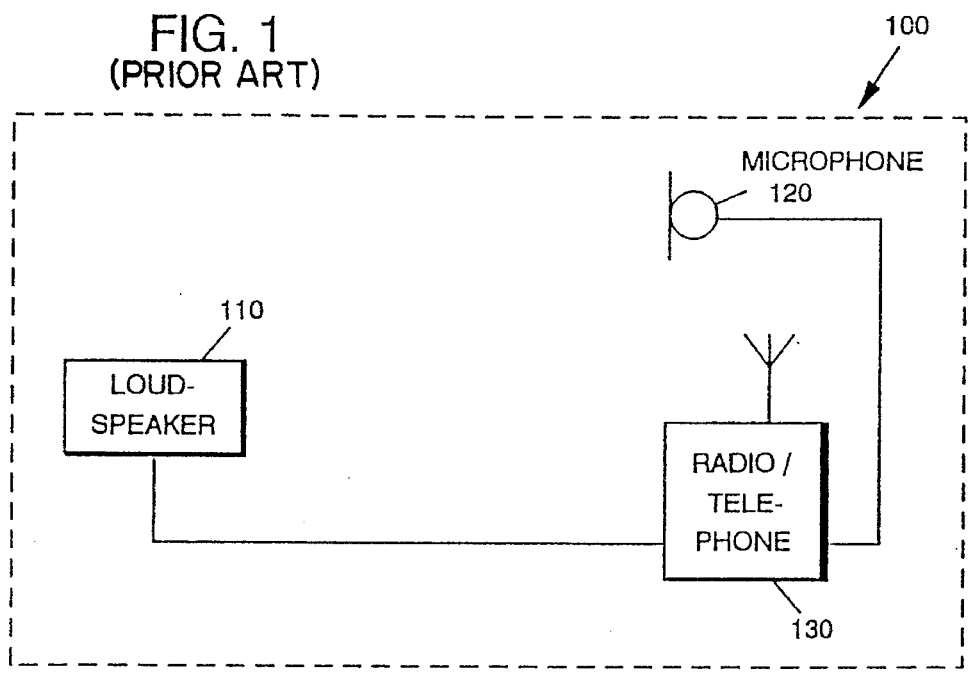
FIG. 1 is a simplified block diagram showing a conventional hands-free arrangement of a radiotelephone as used in a vehicular application.
Figure 2:
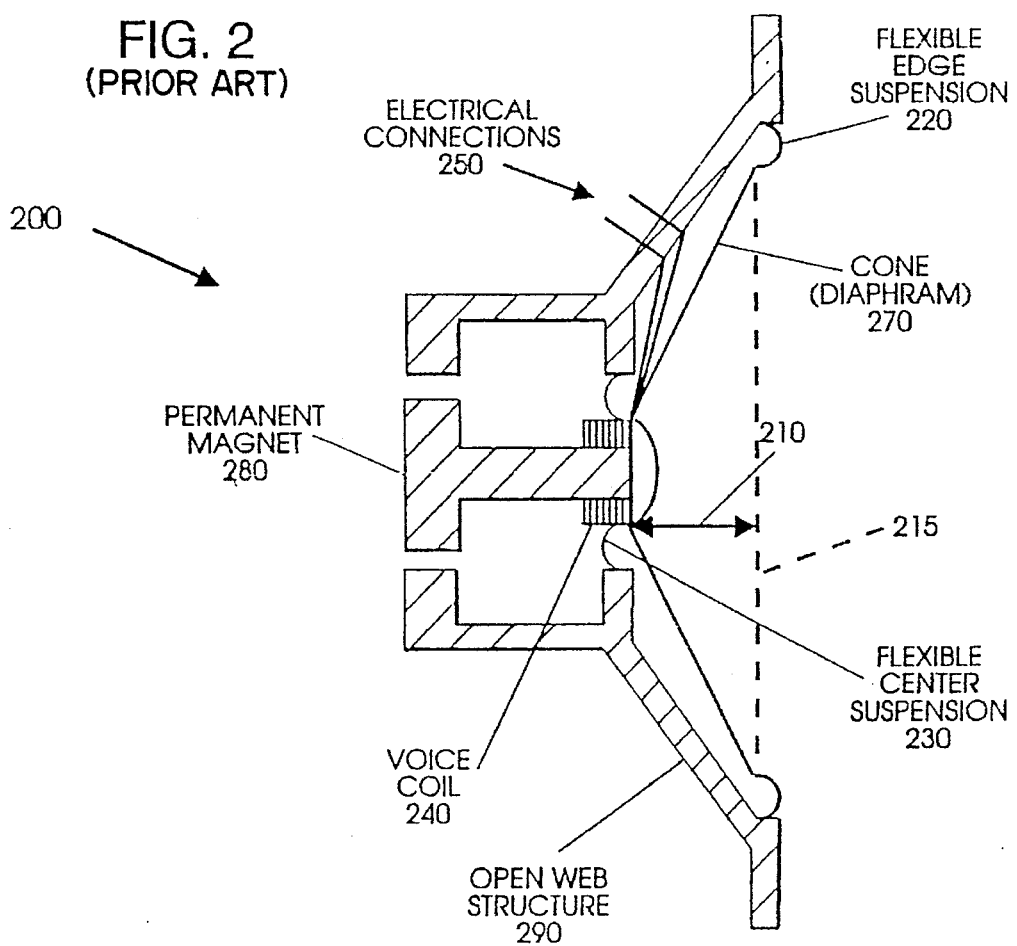
FIG. 2 is a simplified cross-sectional view of a conventional moving coil loudspeaker.
Figure 3:
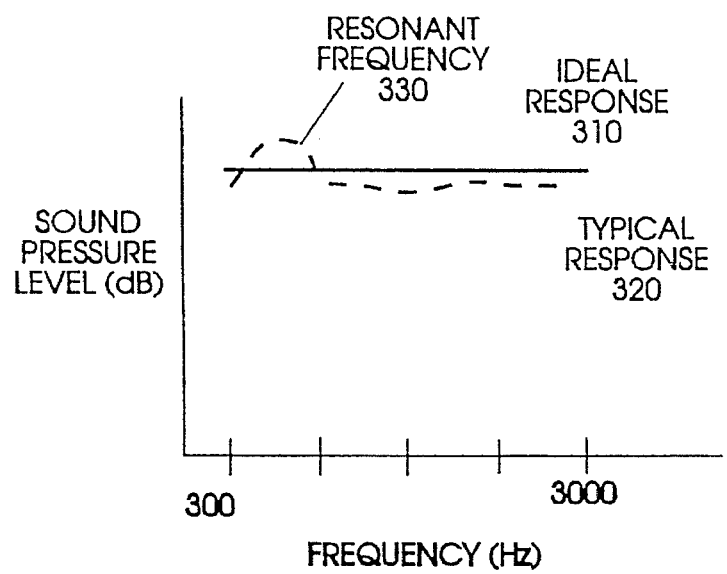
FIG. 3 graphically illustrates the frequency characteristics of a conventional moving coil loudspeaker.
Figure 4:
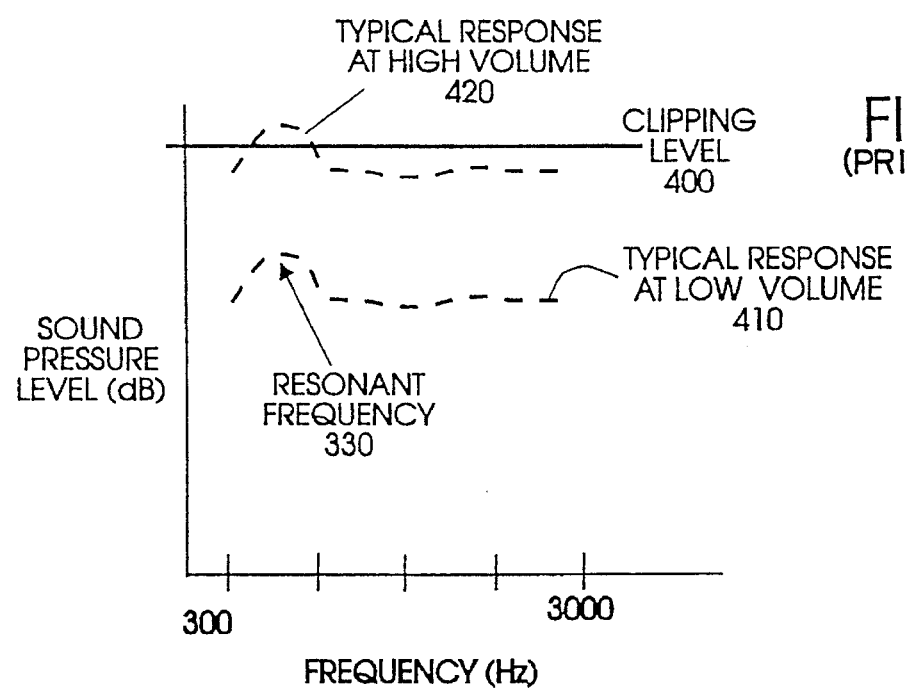
FIG. 4 graphically illustrates the frequency characteristics of a conventional moving coil loudspeaker at a low and high volume level.
Figure 5:
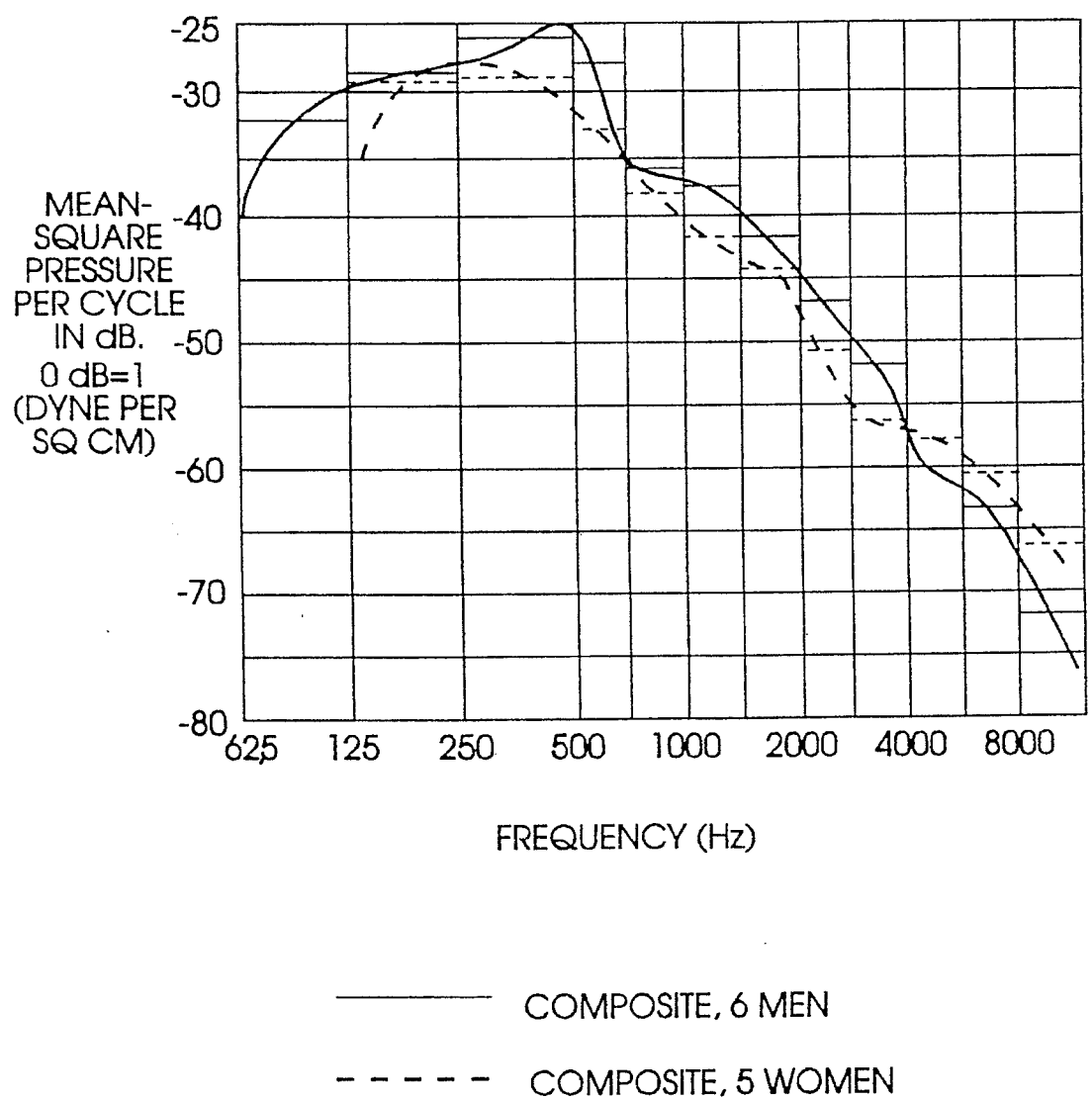
FIG. 5 graphically illustrates the long-term power density spectrum for continuous human speech.
Figure 6:
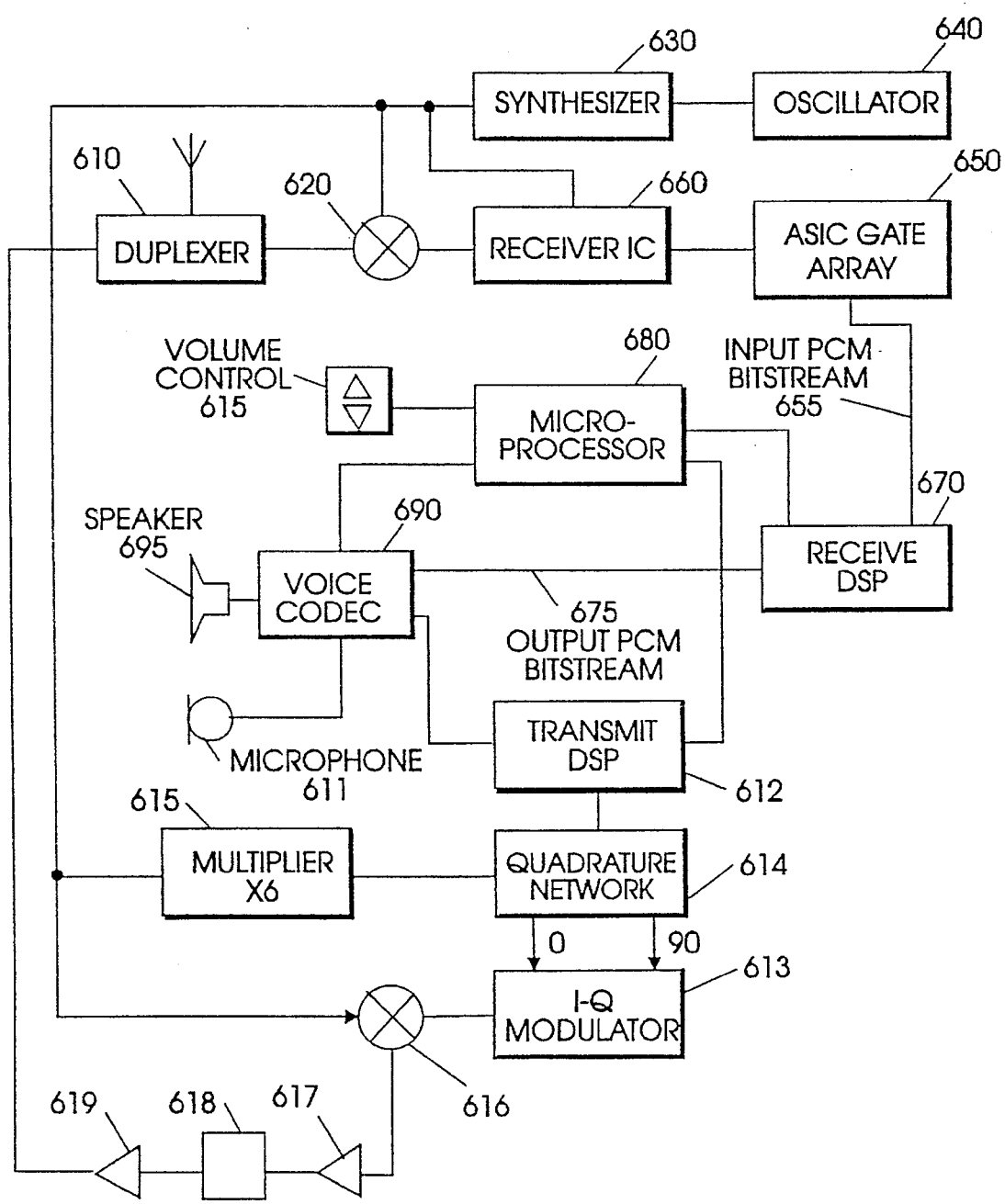
FIG. 6 schematically illustrates a portable radiotelephone according to the present invention.

FIG. 6 schematically illustrates a portable radiotelephone according to the present invention. The duplexer 610 receives an input signal. The radio transceiver, illustrated in FIG. 6 as the phase locked loop (PLL) transceiver circuity of multiplier 620, synthesizer 630, oscillator 640 and receiver integrated circuit (IC) 660, converts the signal received by the duplexer 610 into a received input signal. While a specific system and method of receiving an audio signal has been provided for illustrative purposes, other systems and methods of receiving an audio signal known to one of skill in this art may also be employed.

As seen in FIG. 6, the microprocessor 680 informs the receive digital signal processor (DSP) 670 of the volume setting of volume control 615 selected by the user. The volume setting may be controlled by the user by rotating or sliding a switch or potentiometer, by depressing volume control keys which are read by the microprocessor to select the volume, by voice activated volume control commands, or by other means known to those of skill in this art for selecting the volume of sound output by a loudspeaker. The setting of volume control 615 may be sensed or detected by the microprocessor by reading the position of a rotary switch or potentiometer or by storing a volume setting in a register and updating the volume setting each time the user depresses a volume control switch or set of switches or by other means for sensing the volume setting selected by a user which are known in the art.

In FIG. 6, the ASIC gate array 650 produces an input pulse code modulated (PCM) bit stream 655 recovered from the receive portion of the radio transceiver. PCM is a well-known technique for digitizing analog speech, and is employed, for example, by landline telephone systems in a time division multiple access system. Each sample digitally represents the instantaneous amplitude of the sampled analog signal quantized to the nearest discrete value. Instructions programmed into the receive DSP 670 control the processing of the received signal based upon the volume setting and the amplitude of the input PCM samples.

The input PCM samples from the input PCM bitstream, 655, are selectively attenuated by the receive DSP 670 to produce the output PCM bitstream 675. According to the present invention, the input PCM samples are selectively attenuated so as to reduce the likelihood that the electrical audio signal will overload the loudspeaker 695. Selectively amplifying and attenuating the input PCM bitstream 655 achieves further compression of the dynamic range of the input PCM bitstream 655. The voice coder decoder (CODEC) 690 then converts the output PCM bitstream 675 from PCM digital format to analog electrical format to create an electrical audio signal which drives the loudspeaker 695.

FIG. 6 also illustrates the transmit path of a dual-mode (i.e., analog and digital) radiotelephone. Speech signals received by the microphone 611 are digitized into PCM via the voice codec 690. The PCM samples are passed to the transmit DSP 612 which generates the modulation signal to be imposed on the RF carrier. The technique used is known as pi/4-shifted DQPSK and is generated using the IQ modulator 613 which itself receives two quadrature signals derivative from the synthesizer from the Quadrature Network 614 and the X6 Multiplier 615. The output of the IQ modulator is upconverted (i.e., brought up to the RF carrier frequency) via an upconverting mixer 616. The output of the mixer is preamplified using a gain controlled amplifier 617, stripped of unwanted signal components via a bandpass filter 618 and then amplified to a large signal via the power amplifier 619. The output of the power amplifier is coupled to the duplexer 610 and then to the antenna and out into the ether. The whole operation is microprocessor controlled—using the same microprocessor, synthesizer 630, duplexer 610 and antenna as the receive circuit.

As described herein, the receive DSP 670 operates on an input PCM bitstream to produce an output PCM bitstream. The output PCM bitstream results in an audio signal to the loudspeaker 695 which reduces the overload of the loudspeaker and thereby increase the intelligibility of human speech reproduced by the loudspeaker. However, other means for reducing loudspeaker overload, such as analog circuitry responsive to the volume selected by a user to selectively amplify or attenuate an input analog audio signal or high-pass filtering with variable gain-slope characteristics may be employed. Furthermore, other digital circuitry known to one of skill in the art could be utilized to manipulate PCM digital signals, or other formats for digital signals, according to the present invention.

The embodiment of the present invention illustrated in FIG. 6 will now be described with reference to FIGS. 7, 8, 9 and 10.

Figure 7:
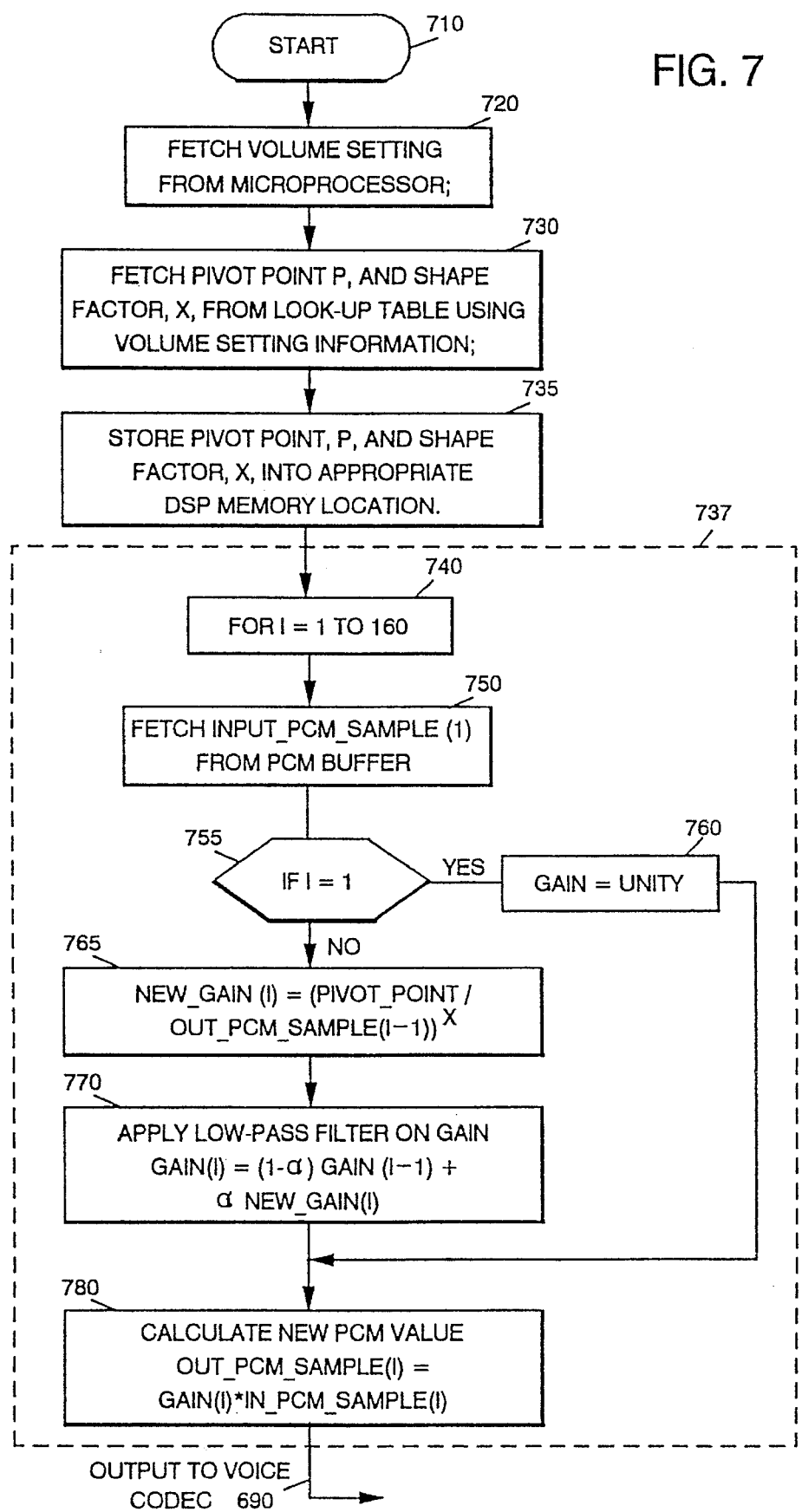
FIG. 7 is a flowchart illustrating operation of the radiotelephone of FIG. 6.

FIG. 7 illustrates the operation of the apparatus shown in FIG. 6. FIG. 7 illustrates operations that are executed for each new frame of 160 PCM samples 1010 (illustrated in FIG. 10) from the input PCM bitstream 655. In FIG. 7, beginning at block 710, the microprocessor 680, which coordinates and regulates the operations of the receive DSP 670, first fetches the volume setting (720) from a memory register located within the microprocessor 680. The microprocessor memory register contains the current value of the volume level. By revising the memory register in response to the activation of the volume keys 615 the memory register reflects the present setting of the volume control. Once the microprocessor has obtained the volume level from the memory register, the microprocessor uses the volume level as an index to retrieve the corresponding pivot point 1020 and shape factor 1030 (730) from a look-up table 800 similar to that shown in FIG. 8. The look-up table may be stored in a memory device coupled to the microprocessor. The pivot point and shape factor values are then written temporarily to memory registers (735) located in the receive DSP 670.

Having obtained the pivot point and shape factor corresponding to the volume level for each frame of 160 PCM samples (740), the loop shown in block 737 is then initiated. The receive DSP 670 stores each frame of 160 PCM samples received from the Gate Array 650 in temporary memory on board the receive DSP 670. Once in the loop 737, the receive DSP 670 sequentially retrieves (750) and processes each sample in the 160 PCM sample frame. Because the gain calculation relies upon the previous output value, the receive DSP 670 treats the first input sample (i.e., input PCM sample #1) differently than the others. For the first sample, the receive DSP 670 sets the gain equal to unity and the output PCM sample is identical to the input PCM sample (755, 760). For subsequent input PCM samples, a new gain value is determined according to the following calculation (765):

$$\text{Gain}(I) = \left[ \frac{\text{pivot point}}{\text{output } PCM \text{ sample}(I-1)} \right]^x$$

where Gain(I) is the gain of the $I^{th}$ input PCM sample, pivot point is the pivot point value stored in the DSP 670, output PCM sample(I-1) is the value of the previous output PCM sample and x is the shape factor stored in the DSP 670. Therefore, gain becomes proportional to the difference between the amplitude of the input signal and the preselected pivot point.

Since the first sample has been essentially skipped, output PCM sample (I-1) is non-zero. To prevent the gain from rapidly varying and causing undesirable sound characteristics, the gain may optionally be low-pass filtered (770) according to the following exemplary equation:

$$\text{filtered gain}(I) = (1-\alpha)\text{gain}(I-1) + \alpha \text{gain}(I)$$

where α is a constant value between 0 and 1 and is related to the cutoff frequency of the low-pass filter. As with the determination of the gain value for the first element of the input sample frame, the receive DSP 670 sets the filtered gain value to unity to prevent anomalies. As will be appreciated by one of skill in this art, other low-pass filtering methods may be employed to filter gain values such as higher order low-pass filters, Chebyshev filters, Butterworth filters, Bessel filters, elliptic filters and the like. Furthermore, as will be appreciated by one of skill in this art, analog filtering as well as digital filtering may be employed in the present invention as a means for filtering an output signal to the loudspeaker.

After filtering, the receive DSP 670 applies the filtered gain value to the input PCM sample to obtain the output PCM sample. The receive DSP 670 passes the output PCM samples to the voice CODEC 690 where they are reconstituted to an analog signal (via a digital to analog converter). The analog audio signal then drives a loudspeaker 695 to reproduce audible sounds.

Figures 8, 9:
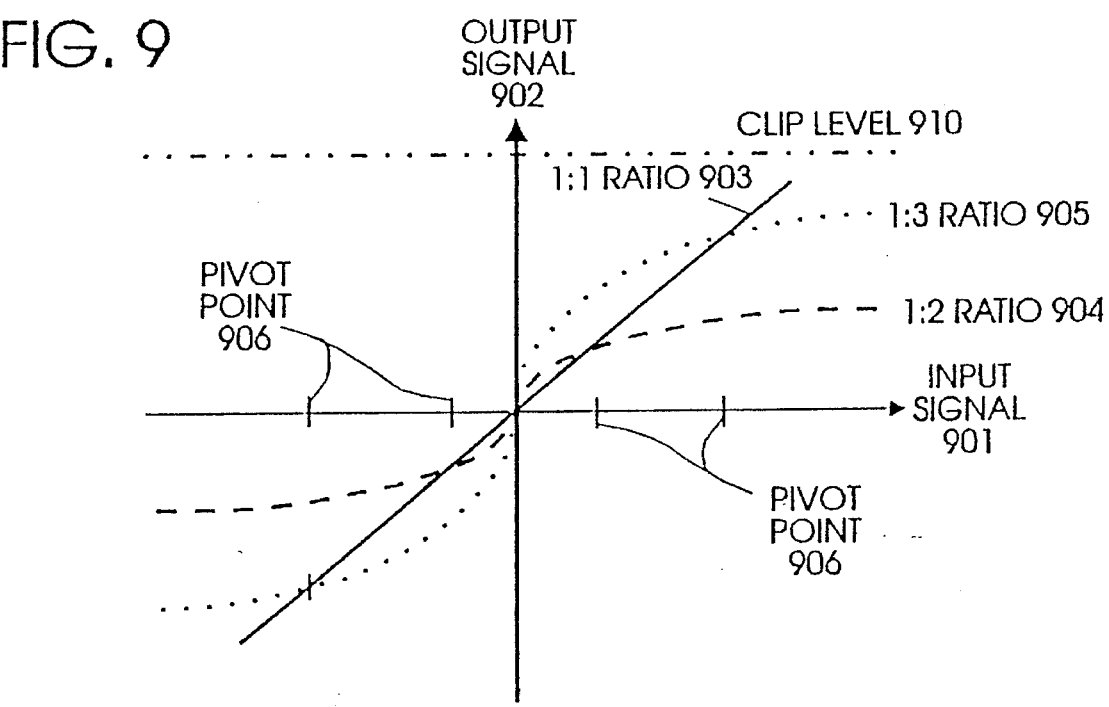
FIG. 8 is an exemplary look-up table for use in the operation of FIG. 6.
FIG. 9 graphically illustrates the input versus output characteristics for various pivot points and shape factors of the present invention.

FIG. 8 is a representative look-up table 800 for use in an apparatus or method according to the present invention. As seen in FIG. 8, for low volume levels (i.e., volume levels 0 through 3 inclusive) the zero shape factor applies no compression to the signal. For low volume levels the radiotelephone volume control operates as a conventional volume control. As the volume increases (e.g. to levels 4 through 7) the shape factor 1030 becomes nonzero resulting in PCM samples above the pivot point being attenuated and those below the pivot point being amplified. The combination of attenuation and amplification results in a compression of the dynamic range of the output signal.

FIG. 9 shows a graph of the output signal 902 versus the input signal 901 achieved by use of one embodiment of the present invention. FIG. 9 illustrates coupling the volume control of the signal to the loudspeaker to the intelligibility control to provide a single user interface. As seen in FIG. 9, at low volume levels no compression is required and hence, no compression is applied. Thus, no alteration of the amplitude of the audio signal occurs at volume levels below a preselected volume setting. The solid line 903 illustrates the gain characteristics associated with such an embodiment of the present invention for low volume signals (i.e., a 1:1 ratio, no compression).

When the volume control has reached its upper linear limit, then the volume control enters a mode of intelligibility control. In the intelligibility control mode further increasing the volume control level results in varying levels of dynamic compression 904, 905 rather than the usual increase in volume. The pivot points 906, as shown in FIG. 9, have been selected for a particular radiotelephone apparatus to reduce the likelihood of the loudspeaker overloading (i.e. delivering an output signal to the loudspeaker above the clip level 910).

As will be appreciated by one of skill in this art, various other numbers of pivot points, locations of pivot points and varying shape factors may be utilized in differing combinations to provide signal compressions which minimize the loss of fidelity in the reproduced sound while maintaining the intelligibility of the sound. As seen in FIG. 9, for amplitudes of the input audio signal above a preselected pivot point a decrease in the amplitude of the input audio signal results. For amplitudes of the input audio signal below the preselected pivot point an increase in the amplitude of the input audio signal results. As FIG. 9 further illustrates, a plurality or set of pivot points may be utilized to provide differing pivot points for different volume settings.

Figure 10:
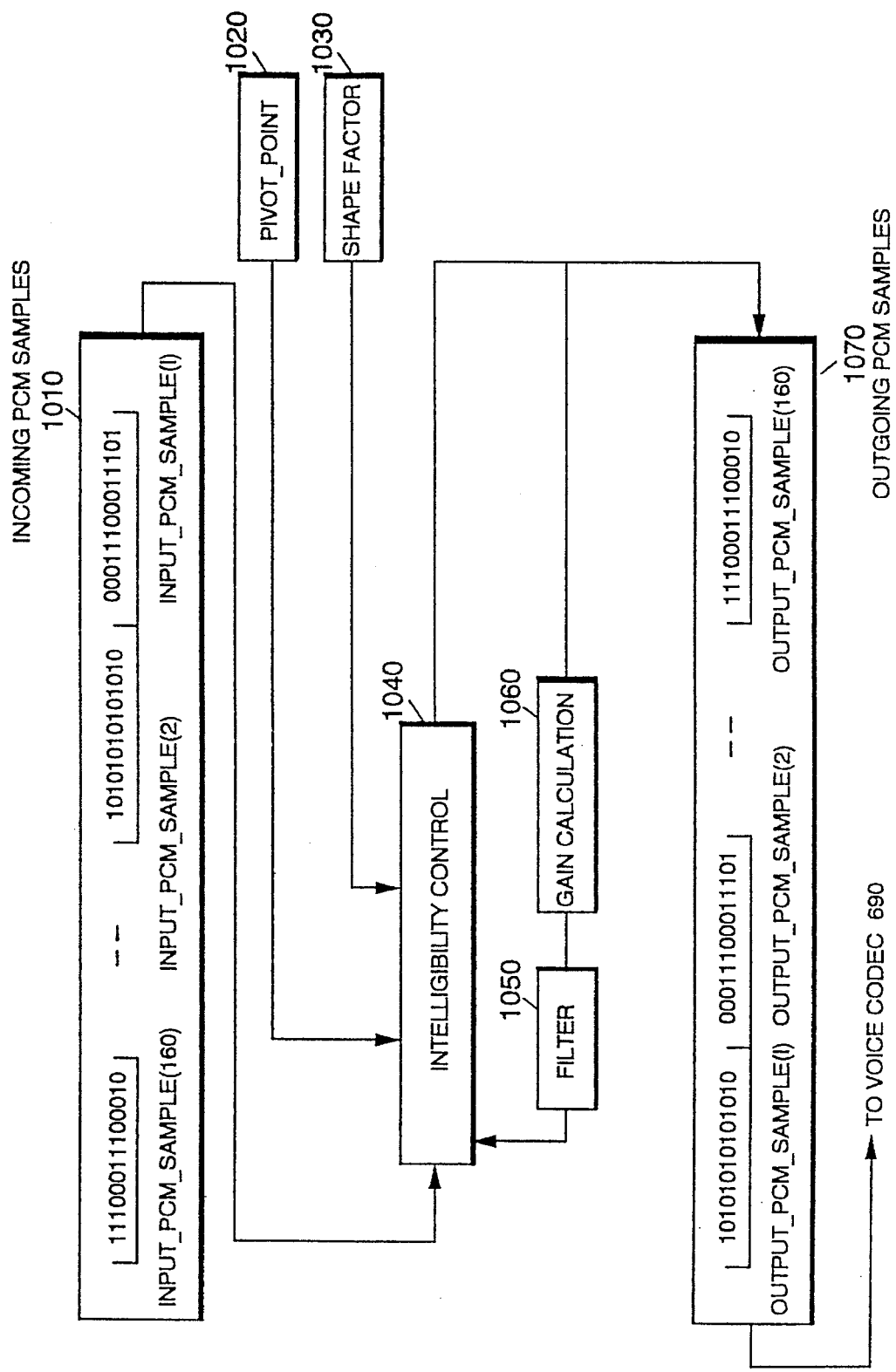
FIG. 10 schematically illustrates operation of the portable radiotelephone of FIG. 6.

FIG. 10 illustrates in more detail the operations described above. Block 1010 shows an example of the input PCM bitstream, which consists of a sequential serial stream of 160 PCM samples, each having 14 bits. In this instance, the PCM bitstream has been recovered from the received radio signal and represents the speech signal that had been sent by the sender. Further referring to FIG. 10, the input PCM samples 1010 are passed into the receive DSP 670 where, among other things, application of the volume and intelligibility control 1040 occurs. Memory registers within the intelligibility control 1040 of the DSP 670 are loaded with the pivot point 1020 and the shape factor 1030 for a particular volume setting received from the microprocessor 680. The pivot point and shape factor values are determined by the microprocessor 680 in response to adjustments of the volume control 615 using the look-up table 800 of FIG. 8. The intelligibility control 1040, the filter 1050 and the gain calculation 1060 then processes the input PCM bitstream as described above to produce an output PCM bitstream 1070. The digital to analog converter in the voice CODEC 690 converts the output PCM bitstream to an analog signal. This analog signal then drives the loudspeaker 695.

FIG. 11 schematically illustrates an alternative embodiment of a receive digital signal processor according to the present invention. The recieve digital signal processor 1100 shown in FIG. 11 receives the phase and amplitude information from an ASIC gate array such as that illustrated in FIG. 6. The demodulator/equalizer 1120 converts the phase/amplitude information into a bit sequence representative of the transmitted signal. The channel decoder 1130 uses a Viterbi algorithm to extract the speech information (the speech bits) from the bit sequence representing the transmitted signal. The speech bits are the sent to a speech decoder 1140 which produces the PCM bitstream. The speech decoder 1140 acts as a large look-up table to produce the PCM bitstream. The PCM bitstream is then sent to the volume intelligibility control 1160 which operates as described above to selectively process the PCM bitstream to reduce the likelihood of loudspeaker overload.

Accordingly, the intelligibility of human speech reproduced through a volume controlled loudspeaker results from detecting the amplitude of an audio signal input to a loudspeaker which causes the loudspeaker to overload. Upon reaching the overload point, selectively decreasing the amplitude of the audio signal input to the loudspeaker reduces the likelihood of the loudspeaker overloading. Detection of the amplitude at which the audio signal will cause the loudspeaker to overload may be carried out by detecting the volume setting of a volume control for the loudspeaker.

Additionally, the amplitudes of the audio signal sent to the loudspeaker above a specified pivot point may be decreased and the amplitude below the specified pivot point increased. Optionally, the pivot point may be selected based upon the volume selected by a user and the amplitude of the audio signal not altered for detected volume settings below a preselected volume setting. Furthermore, as discussed above, the preselected pivot point may be selected from a set of preselected pivot points based upon the detected volume setting.

The amount of increase and decrease in the amplitude of the electrical audio signal may be proportional to the difference between the electrical audio signal amplitude and the preselected pivot point. The amount of increase and decrease in the amplitude of the electrical audio signal may also be proportional to the difference between the electrical audio signal amplitude and the preselected pivot point raised to the power of a shape factor associated with the preselected pivot point. In either case, a reduction in the likelihood of loudspeaker overload results.

In the drawings and specification, there have been disclosed typical preferred embodiments of the invention and, although specific terms are employed, these terms are used in a generic and descriptive sense only and not for purposes of limitation, the scope of the invention being set forth in the following claims.

That which is claimed:

1. An audio system comprising:

a loudspeaker for converting an electrical audio signal into sound;

volume control means for selecting an amplitude of sound from said loudspeaker; and loudspeaker overload reducing means, responsive to a selected volume setting of said volume control means, for selectively decreasing the amplitude of said electrical audio signal based upon said selected volume control setting so as to reduce overload in said loudspeaker and thereby increase the intelligibility of human speech reproduced by said loudspeaker based upon said selected volume control setting.

2. The audio system of claim 1 further comprising detection means for detecting the selected volume setting of said volume control means, said loudspeaker overload reducing means being responsive to said detection means.

3. The audio system of claim 1 wherein said loudspeaker overload reducing means comprises means for selectively increasing and decreasing the amplitude of said electrical audio signal based upon said selected volume control setting so as to reduce overload of said loudspeaker.

4. The audio system of claim 1 wherein said loudspeaker overload reducing means comprises means for passing the amplitude of said audio signal to said loudspeaker without attenuation of amplification if said detected volume setting is below a preselected volume setting.

5. The audio system of claim 1 wherein said loudspeaker overload reducing means comprises means for decreasing the amplitude of said electrical audio signal if said electrical audio signal amplitude is above a preselected pivot point and for increasing the amplitude of said electrical audio signal if said electrical audio signal amplitude is below said preselected pivot point.

6. The audio system of claim 5 wherein said loudspeaker overload reducing means comprises means for selecting said preselected pivot point from a set of preselected pivot points based upon said detected volume setting.

7. The audio system of claim 5 wherein said means for decreasing and increasing the amplitude of said electrical audio signal comprises means for increasing and decreasing the amplitude of said electrical audio signal in proportion to the difference between said electrical audio signal amplitude and said preselected pivot point.

8. The audio system of claim 5 wherein said means for decreasing and increasing the amplitude of said electrical audio signal comprises means for increasing and decreasing the amplitude of said electrical audio signal in proportion to the difference between said electrical audio signal amplitude and said preselected pivot point raised to the power of a shape factor associated with said preselected pivot point.

9. The audio system of claim 1 wherein said loudspeaker is a speakerphone loudspeaker.

10. The audio system of claim 1 wherein said loudspeaker is a radiotelephone loudspeaker.

11. A method of increasing the intelligibility of human speech reproduced through a volume controlled loudspeaker, comprising the steps of:

detecting the volume setting of a volume control for said loudspeaker; and selectively decreasing the amplitude of the audio signal input to the loudspeaker based upon the detected volume control setting to reduce the likelihood of the loudspeaker overloading.

12. The method of claim 11 wherein said selectively decreasing step comprises the step of decreasing the amplitude of the audio signal above a pivot point and increasing the amplitude of the audio signal below said pivot point.

13. The method of claim 12 wherein the steps of decreasing the amplitude of the audio signal above a pivot point and increasing the amplitude of the audio signal below said pivot point comprises the step of selecting the pivot point based upon the volume selected by a user.

14. The method of claim 13 wherein said steps of decreasing the amplitude of the audio signal above a pivot point and increasing amplitude of the audio signal below said pivot point comprises the step of passing the audio signal without amplification or attenuation if the detected volume setting is below a preselected volume setting.

15. The method of claim 13 wherein said selecting step comprises the step of selecting the pivot point from a set of preselected pivot points based upon the detected volume setting.

16. The method of claim 12 wherein said selectively decreasing step comprises the step of selectively increasing and decreasing the amplitude of said electrical audio signal in proportion to the difference between the electrical audio signal amplitude and the preselected pivot point.

17. The method of claim 12 wherein said selectively decreasing step further comprises the step of selectively increasing and decreasing the amplitude of the electrical audio signal in proportion to the difference between the electrical audio signal amplitude and the preselected pivot point raised to the power of a shape factor associated with the preselected pivot point.

* * * * *

UNITED STATES PATENT AND TRADEMARK OFFICE
CERTIFICATE OF CORRECTION

PATENT NO. :   5,515,432
DATED      :   May 7, 1996
INVENTOR(S) :  Jim A.J. Rasmusson It is certified that error appears in the above-identified patent and that said Letters Patent is hereby corrected as shown below:

TITLE PAGE

[*] Notice:
On the title page, insert:
Expiration date should be November 24, 2013.

Column 1, line 6, delete "patented".
Column 1, line 38, "298" should be --290--.
Column 8, line 66, "800" should be --800--.

Signed and Sealed this

First Day of October, 1996

Attest:

BRUCE LEHMAN

Attesting Officer     Commissioner of Patents and Trademarks